(12) United States Patent
Jungreis et al.

(10) Patent No.: US 8,520,420 B2
(45) Date of Patent: Aug. 27, 2013

(54) CONTROLLER FOR MODIFYING DEAD TIME BETWEEN SWITCHES IN A POWER CONVERTER

(75) Inventors: Aaron Jungreis, Richardson, TX (US); Antony Brinlee, Plano, TX (US); Paul Garrity, Rockwall, TX (US)

(73) Assignee: Power Systems Technologies, Ltd., Ebene (MU)

( * ) Notice: Subject to any disclaimer, the term of this patent is extended or adjusted under 35 U.S.C. 154(b) by 677 days.

(21) Appl. No.: 12/642,448

(22) Filed: Dec. 18, 2009

(65) Prior Publication Data

US 2011/0149607 A1  Jun. 23, 2011

(51) Int. Cl.
H02M 3/335 (2006.01)

(52) U.S. Cl.
USPC .............................. 363/98; 363/17; 363/56.04

(58) Field of Classification Search
USPC ........................................... 363/17, 56.04, 98
See application file for complete search history.

(56) References Cited

U.S. PATENT DOCUMENTS

| | | | |
|---|---|---|---|
| 1,376,978 A | 5/1921 | Stoekle |
| 2,473,662 A | 6/1949 | Pohm |
| 3,007,060 A | 10/1961 | Kronfeld |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,602,795 A | 8/1971 | Gunn |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |

(Continued)

FOREIGN PATENT DOCUMENTS

| | | |
|---|---|---|
| CN | 101141099 | 3/2008 |
| CN | 201252294 | 6/2009 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

Primary Examiner — Jeffrey Sterrett
(74) Attorney, Agent, or Firm — Boisbrun Hofman, PLLC

(57) ABSTRACT

A power converter employing a controller configured to increase a dead time between conduction periods of first and second power switches therein and method of operating the same. In one embodiment, the power converter includes first and second power switches coupled to an input thereof, and a sensor configured to provide a sensed signal representative of at least one of a current level and a power level of the power converter. The power converter also includes a controller configured to increase a dead time between conduction periods of the first and second power switches when the sensed signal indicates a decrease of at least one of the current level and the power level of the power converter.

20 Claims, 5 Drawing Sheets

(56) References Cited

U.S. PATENT DOCUMENTS

| | | |
|---|---|---|
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,770,667 A | 9/1988 | Evans et al. |
| 4,770,668 A | 9/1988 | Skoultchi et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Husgen |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A * | 7/1996 | Pietkiewicz et al. ............ 363/17 |
| 5,554,561 A | 9/1996 | Plumton |
| 5,555,494 A | 9/1996 | Morris |
| 5,610,085 A | 3/1997 | Yuan et al. |
| 5,624,860 A | 4/1997 | Plumton et al. |
| 5,663,876 A | 9/1997 | Newton et al. |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A * | 7/1999 | Ichikawa et al. ............ 327/109 |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,055,166 A | 4/2000 | Jacobs et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,400,579 B2 | 6/2002 | Cuk |

| | | | | | | |
|---|---|---|---|---|---|---|
| 6,414,578 B1 | 7/2002 | Jitaru | | 7,360,004 B2 | 4/2008 | Dougherty et al. |
| 6,438,009 B2 | 8/2002 | Assow | | 7,362,592 B2 | 4/2008 | Yang et al. |
| 6,462,965 B1 | 10/2002 | Uesono | | 7,362,593 B2 | 4/2008 | Yang et al. |
| 6,466,461 B2 | 10/2002 | Mao et al. | | 7,375,607 B2 | 5/2008 | Lee et al. |
| 6,469,564 B1 | 10/2002 | Jansen | | 7,385,375 B2 | 6/2008 | Rozman |
| 6,477,065 B2 | 11/2002 | Parks | | 7,386,404 B2 | 6/2008 | Cargonja et al. |
| 6,483,724 B1 | 11/2002 | Blair et al. | | 7,417,875 B2 | 8/2008 | Chandrasekaran et al. |
| 6,489,754 B2 | 12/2002 | Blom | | 7,427,910 B2 | 9/2008 | Mehrotra et al. |
| 6,498,367 B1 | 12/2002 | Chang et al. | | 7,446,512 B2 | 11/2008 | Nishihara et al. |
| 6,501,193 B1 | 12/2002 | Krugly | | 7,447,049 B2 | 11/2008 | Garner et al. |
| 6,504,321 B2 | 1/2003 | Giannopoulos et al. | | 7,468,649 B2 | 12/2008 | Chandrasekaran |
| 6,512,352 B2 | 1/2003 | Qian | | 7,471,523 B2 | 12/2008 | Yang |
| 6,525,603 B1 | 2/2003 | Morgan | | 7,489,225 B2 | 2/2009 | Dadafshar |
| 6,539,299 B2 | 3/2003 | Chatfield et al. | | 7,499,295 B2 | 3/2009 | Indika de Silva et al. |
| 6,545,453 B2 | 4/2003 | Glinkowski et al. | | 7,554,430 B2 | 6/2009 | Mehrotra et al. |
| 6,548,992 B1 | 4/2003 | Alcantar et al. | | 7,558,037 B1 | 7/2009 | Gong et al. |
| 6,549,436 B1 | 4/2003 | Sun | | 7,558,082 B2 | 7/2009 | Jitaru |
| 6,552,917 B1 | 4/2003 | Bourdillon | | 7,567,445 B2 | 7/2009 | Coulson et al. |
| 6,563,725 B2 | 5/2003 | Carsten | | 7,630,219 B2 | 12/2009 | Lee |
| 6,570,268 B1 | 5/2003 | Perry et al. | | 7,633,369 B2 | 12/2009 | Chandrasekaran et al. |
| 6,580,627 B2 * | 6/2003 | Toshio .......................... 363/98 | | 7,663,183 B2 | 2/2010 | Brar et al. |
| 6,597,592 B2 | 7/2003 | Carsten | | 7,667,986 B2 | 2/2010 | Artusi et al. |
| 6,608,768 B2 | 8/2003 | Sula | | 7,675,758 B2 | 3/2010 | Artusi et al. |
| 6,611,132 B2 | 8/2003 | Nakagawa et al. | | 7,675,759 B2 | 3/2010 | Artusi et al. |
| 6,614,206 B1 | 9/2003 | Wong et al. | | 7,675,764 B2 | 3/2010 | Chandrasekaran et al. |
| 6,654,259 B2 | 11/2003 | Koshita et al. | | 7,746,041 B2 | 6/2010 | Xu et al. |
| 6,661,276 B1 | 12/2003 | Chang | | 7,778,050 B2 | 8/2010 | Yamashita |
| 6,668,296 B1 | 12/2003 | Dougherty et al. | | 7,778,051 B2 | 8/2010 | Yang |
| 6,674,658 B2 | 1/2004 | Mao et al. | | 7,787,264 B2 | 8/2010 | Yang et al. |
| 6,683,797 B2 | 1/2004 | Zaitsu et al. | | 7,791,903 B2 | 9/2010 | Zhang et al. |
| 6,687,137 B1 | 2/2004 | Yasumura | | 7,795,849 B2 | 9/2010 | Sohma |
| 6,696,910 B2 | 2/2004 | Nuytkens et al. | | 7,813,101 B2 | 10/2010 | Morikawa |
| 6,731,486 B2 | 5/2004 | Holt et al. | | 7,847,535 B2 | 12/2010 | Meynard et al. |
| 6,741,099 B1 | 5/2004 | Krugly | | 7,889,517 B2 | 2/2011 | Artusi et al. |
| 6,753,723 B2 | 6/2004 | Zhang | | 7,889,521 B2 | 2/2011 | Hsu |
| 6,765,810 B2 | 7/2004 | Perry | | 7,940,035 B2 | 5/2011 | Yang |
| 6,775,159 B2 | 8/2004 | Webb et al. | | 7,965,528 B2 | 6/2011 | Yang et al. |
| 6,784,644 B2 | 8/2004 | Xu et al. | | 7,983,063 B2 | 7/2011 | Lu et al. |
| 6,804,125 B2 | 10/2004 | Brkovic | | 8,004,112 B2 | 8/2011 | Koga et al. |
| 6,813,170 B2 | 11/2004 | Yang | | 8,179,699 B2 | 5/2012 | Tumminaro et al. |
| 6,831,847 B2 | 12/2004 | Perry | | 8,278,889 B2 | 10/2012 | Tataeishi |
| 6,856,149 B2 | 2/2005 | Yang | | 2002/0057080 A1 | 5/2002 | Telefus et al. |
| 6,862,194 B2 | 3/2005 | Yang et al. | | 2002/0114172 A1 | 8/2002 | Webb et al. |
| 6,867,678 B2 | 3/2005 | Yang | | 2003/0026115 A1 | 2/2003 | Miyazaki |
| 6,867,986 B2 | 3/2005 | Amei | | 2003/0197585 A1 | 10/2003 | Chandrasekaran et al. |
| 6,873,237 B2 | 3/2005 | Chandrasekaran et al. | | 2003/0198067 A1 | 10/2003 | Sun et al. |
| 6,882,548 B1 | 4/2005 | Jacobs et al. | | 2004/0017689 A1 | 1/2004 | Zhang et al. |
| 6,906,934 B2 | 6/2005 | Yang et al. | | 2004/0034555 A1 | 2/2004 | Dismukes et al. |
| 6,943,553 B2 | 9/2005 | Zimmermann et al. | | 2004/0148047 A1 | 7/2004 | Dismukes et al. |
| 6,944,033 B1 | 9/2005 | Xu et al. | | 2004/0156220 A1 | 8/2004 | Kim et al. |
| 6,977,824 B1 | 12/2005 | Yang et al. | | 2004/0200631 A1 | 10/2004 | Chen |
| 6,980,077 B1 | 12/2005 | Chandrasekaran et al. | | 2004/0217794 A1 | 11/2004 | Strysko |
| 6,982,887 B2 | 1/2006 | Batarseh et al. | | 2005/0024179 A1 | 2/2005 | Chandrasekaran et al. |
| 7,009,486 B1 | 3/2006 | Goeke et al. | | 2005/0245658 A1 | 11/2005 | Mehrotra et al. |
| 7,012,414 B1 | 3/2006 | Mehrotra et al. | | 2005/0281058 A1 | 12/2005 | Batarseh et al. |
| 7,016,204 B2 | 3/2006 | Yang et al. | | 2006/0007713 A1* | 1/2006 | Brown .......................... 363/17 |
| 7,026,807 B2 | 4/2006 | Anderson et al. | | 2006/0038549 A1 | 2/2006 | Mehrotra et al. |
| 7,034,586 B2 | 4/2006 | Mehas et al. | | 2006/0038649 A1 | 2/2006 | Mehrotra et al. |
| 7,034,647 B2 | 4/2006 | Yan et al. | | 2006/0038650 A1 | 2/2006 | Mehrotra et al. |
| 7,046,523 B2 | 5/2006 | Sun et al. | | 2006/0109698 A1 | 5/2006 | Qu |
| 7,061,358 B1 | 6/2006 | Yang | | 2006/0187684 A1 | 8/2006 | Chandrasekaran et al. |
| 7,076,360 B1 | 7/2006 | Ma | | 2006/0197510 A1 | 9/2006 | Chandrasekaran |
| 7,095,638 B2 | 8/2006 | Uusitalo | | 2006/0198173 A1 | 9/2006 | Rozman |
| 7,099,163 B1 | 8/2006 | Ying | | 2006/0226477 A1 | 10/2006 | Brar et al. |
| 7,148,669 B2 | 12/2006 | Maksimovic et al. | | 2006/0226478 A1 | 10/2006 | Brar et al. |
| 7,170,268 B2 | 1/2007 | Kim | | 2006/0237968 A1 | 10/2006 | Chandrasekaran |
| 7,176,662 B2 | 2/2007 | Chandrasekaran | | 2006/0255360 A1 | 11/2006 | Brar et al. |
| 7,209,024 B2 | 4/2007 | Nakahori | | 2007/0007945 A1 | 1/2007 | King et al. |
| 7,269,038 B2 | 9/2007 | Shekhawat et al. | | 2007/0030717 A1* | 2/2007 | Luger et al. .................... 363/132 |
| 7,280,026 B2 | 10/2007 | Chandrasekaran et al. | | 2007/0045765 A1 | 3/2007 | Brar et al. |
| 7,285,807 B2 | 10/2007 | Brar et al. | | 2007/0069286 A1 | 3/2007 | Brar et al. |
| 7,298,118 B2 | 11/2007 | Chandrasekaran | | 2007/0114979 A1 | 5/2007 | Chandrasekaran |
| 7,301,785 B2 | 11/2007 | Yasumura | | 2007/0222463 A1 | 9/2007 | Qahouq et al. |
| 7,312,686 B2 | 12/2007 | Bruno | | 2007/0241721 A1 | 10/2007 | Weinstein et al. |
| 7,321,283 B2 | 1/2008 | Mehrotra et al. | | 2007/0296028 A1 | 12/2007 | Brar et al. |
| 7,332,992 B2 | 2/2008 | Iwai | | 2007/0298559 A1 | 12/2007 | Brar et al. |
| 7,339,208 B2 | 3/2008 | Brar et al. | | 2007/0298564 A1 | 12/2007 | Brar et al. |
| 7,339,801 B2 | 3/2008 | Yasumura | | 2008/0024259 A1 | 1/2008 | Chandrasekaran et al. |
| 7,348,612 B2 | 3/2008 | Sriram et al. | | 2008/0054874 A1 | 3/2008 | Chandrasekaran et al. |

| | | | |
|---|---|---|---|
| 2008/0111657 | A1 | 5/2008 | Mehrotra et al. |
| 2008/0130321 | A1 | 6/2008 | Artusi et al. |
| 2008/0130322 | A1 | 6/2008 | Artusi et al. |
| 2008/0137381 | A1 | 6/2008 | Beasley |
| 2008/0150666 | A1 | 6/2008 | Chandrasekaran et al. |
| 2008/0205104 | A1* | 8/2008 | Lev et al. ............ 363/98 |
| 2008/0224812 | A1 | 9/2008 | Chandrasekaran |
| 2008/0232141 | A1 | 9/2008 | Artusi et al. |
| 2008/0310190 | A1 | 12/2008 | Chandrasekaran et al. |
| 2008/0315852 | A1 | 12/2008 | Jayaraman et al. |
| 2008/0316779 | A1 | 12/2008 | Jayaraman et al. |
| 2009/0051346 | A1* | 2/2009 | Manabe et al. ............ 323/363 |
| 2009/0097290 | A1 | 4/2009 | Chandrasekaran |
| 2009/0257250 | A1 | 10/2009 | Liu |
| 2009/0273957 | A1* | 11/2009 | Feldtkeller ............ 363/98 |
| 2009/0284994 | A1 | 11/2009 | Lin et al. |
| 2009/0315530 | A1 | 12/2009 | Baranwal |
| 2010/0091522 | A1 | 4/2010 | Chandrasekaran et al. |
| 2010/0123486 | A1 | 5/2010 | Berghegger |
| 2010/0149838 | A1 | 6/2010 | Artusi et al. |
| 2010/0182806 | A1 | 7/2010 | Garrity et al. |
| 2010/0188876 | A1 | 7/2010 | Garrity et al. |
| 2010/0254168 | A1 | 10/2010 | Chandrasekaran |
| 2010/0321958 | A1 | 12/2010 | Brinlee et al. |
| 2010/0321964 | A1 | 12/2010 | Brinlee et al. |
| 2011/0038179 | A1 | 2/2011 | Zhang |
| 2011/0134664 | A1 | 6/2011 | Berghegger |
| 2011/0149607 | A1* | 6/2011 | Jungreis et al. ............ 363/21.02 |
| 2011/0182089 | A1 | 7/2011 | Berghegger |
| 2011/0239008 | A1 | 9/2011 | Lam et al. |
| 2011/0305047 | A1* | 12/2011 | Jungreis et al. ............ 363/21.02 |
| 2012/0243271 | A1 | 9/2012 | Berghegger |
| 2012/0294048 | A1 | 11/2012 | Brinlee |

FOREIGN PATENT DOCUMENTS

| | | |
|---|---|---|
| EP | 0 665 634 A1 | 1/1994 |
| JP | 57097361 | 6/1982 |
| JP | 3-215911 | 9/1991 |
| JP | 2000-68132 | 3/2000 |
| WO | WO8700991 | 2/1987 |
| WO | WO2010083511 | 7/2010 |
| WO | WO2010083514 | 7/2010 |
| WO | WO2010114914 | 10/2010 |
| WO | WO2011116225 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.

Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.

Curtis, K., "Advances in Microcontroller Peripherals Facilitate Current-Mode for Digital Power Supplies," Digital Power Forum '06, 4 pp., Sep. 2006, Darnell Group, Richardson, TX.

Eisenbeiser, K., et al., "Manufacturable GaAs VFET for Power Switching Applications," IEEE Electron Device Letters, Apr. 2000, pp. 144-145, vol. 21, No. 4, IEEE.

Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. 1-264-1-267, vol. 1, IEEE, Geneva, Switzerland.

Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.

Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.

Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.

Kollman, R., et al., "10 MHz PWM Converters with GaAs VFETs," IEEE 11th Annual Applied Power Electronics Conference and Exposition, Mar. 1996, pp. 264-269, vol. 1, IEEE.

Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.

Lenk, R., "Introduction to the Tapped Buck Converter," PCIM 2000, HFPC 2000 Proceedings, Oct. 2000, pp. 155-166.

Liu, W., "Fundamentals of III-V Devices: HBTs, MESFETs, and HFETs/HEMTs," §5-5: Modulation Doping, 1999, pp. 323-330, John Wiley & Sons, New York, NY.

Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.

Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.

Miwa, B.A., et al., "High Efficiency Power Factor Correction Using Interleaving Techniques," IEEE Proceedings of APEC, 1992, pp. 557-568, IEEE, Los Alamitos, CA.

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Kuwabara, K., et al., "Switched-Capacitor DC—DC Converters," Fujitsu Limited, IEEE, 1988, Kawasaki, Japan, pp. 213-218.

Maxim, Application Note 725, www.maxim-ic.com/an725, Maxim Integrated Products, Nov. 29, 2001, 8 pages.

National Semiconductor Corporation, "LM2665 Switched Capacitor Voltage Converter," www.national.com, Sep. 2005, 9 pages.

National Semiconductor Corporation, "LMC7660 Switched Capacitor Voltage Converter," www.national.com, Apr. 1997, 12 pages.

Texas Instruments Incorporated, "LT1054, LT1054Y Switched-Capacitor Voltage Converters With Regulators," SLVS033C, Feb. 1990—Revised Jul. 1998, 25 pages.

Vallamkonda, S., "Limitations of Switching Voltage Regulators," A Thesis in Electrical Engineering, Texas Tech University, May 2004, 89 pages.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

* cited by examiner

CONTROLLER FOR MODIFYING DEAD TIME BETWEEN SWITCHES IN A POWER CONVERTER

TECHNICAL FIELD

The present invention is directed, in general, to power electronics and, more specifically, to a power converter employing a controller configured to control a dead time between conduction periods of power switches and method of operating the same.

BACKGROUND

A switched-mode power converter (also referred to as a "power converter" or "regulator") is a power supply or power processing circuit that converts an input voltage waveform into a specified output voltage waveform. Dc-dc power converters convert a direct current ("dc") input voltage into a dc output voltage. Controllers associated with the power converters manage an operation thereof by controlling conduction periods of power switches employed therein. Some power converters include a controller coupled between an input and output of the power converter in a feedback loop configuration (also referred to as a "control loop" or "closed control loop") to regulate an output characteristic of the power converter. Typically, the controller measures the output characteristic (e.g., an output voltage, an output current, or a combination of an output voltage and an output current) of the power converter, and based thereon modifies a duty cycle, an on time or a switching frequency of a power switch of the power converter to regulate the output characteristic. Other power converters operate in an open-loop manner wherein an output voltage is produced substantially proportional to an input voltage.

A power converter with a low power rating designed to convert an alternating current ("ac") mains voltage to a dc output voltage to power a load such as an electronic device (e.g., a printer, a modem, or a personal computer) is generally referred to as an "ac power adapter" or a "power adapter," or, herein succinctly, as an "adapter." Industry standards and market needs have required continual reductions in no load and low-load power supply loss to reduce power consumed by millions of power converters that may remain plugged in, but are not in use, or that may supply a light load level to an electronic device that is not operating at its full capacity. Efficiency requirements at low output power levels have become important in view of the typical load presented by an electronic device in an idle or sleep mode, or an electronic device not operating at full capacity, which are common operational states for a large fraction of the time for electronic devices such as personal computers and printers in a home or office environment.

Power loss of a power converter is dependent on gate drive voltages for the power switches and other continuing power losses that generally do not vary substantially with the load. These power losses are commonly addressed at very low power levels by using a burst mode of operation wherein the controller is disabled for a period of time (e.g., one second) followed by a short period of high power operation (e.g., 10 milliseconds ("ms")) to provide a low average output power with low dissipation.

Light load power losses, while relatively small, have now become substantial hindrances to improving power converter efficiency as industry requirements become stricter. Thus, despite the development of numerous strategies to reduce power losses of power converters, no satisfactory strategy has emerged to provide substantial reduction of power dissipation while the power converter provides minimal or no power to a load. Accordingly, what is needed in the art is a design approach and related method for a power converter that enables further reduction of power converter losses without compromising product performance, and that can be advantageously adapted to high-volume manufacturing techniques.

SUMMARY OF THE INVENTION

These and other problems are generally solved or circumvented, and technical advantages are generally achieved, by advantageous embodiments of the present invention, including a power converter employing a controller configured to control a dead time between conduction periods of power switches and method of operating the same. In one embodiment, the power converter includes first and second power switches coupled to an input thereof, and a sensor configured to provide a sensed signal representative of at least one of a current level and a power level of the power converter. The power converter also includes a controller configured to increase a dead time between conduction periods of the first and second power switches when the sensed signal indicates a decrease of at least one of the current level and the power level of the power converter.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a power converter configured to provide reduced power dissipation at no load or at light load. While the principles of the present invention will be described in the environment of a power converter, any application that may benefit from a power converter with reduced power dissipation including a bias supply, a power amplifier, or a motor controller is well within the broad scope of the present invention.

A resonant full-bridge or half-bridge power converter, or other resonant power converter topology with a substantially symmetric input current waveform, may be employed in low power and other applications such as in a power adapter for a printer because of its low cost and high power conversion efficiency at power levels of interest for these applications. Power converters are typically designed to operate continuously at their full rated output power level. Recall that loads coupled to power converters such as a load provided by a printer and personal computer are generally variable and usually do not operate for an extended period of time at a rated power level. A consideration for the design of power converters for such applications is power conversion efficiency at no load and at light loads.

A conventionally designed power converter may employ a burst mode of operation to reduce no load or light load losses of a power converter by using a short duration of operation (i.e., by employing a high power "burst" followed by a longer idle period). An output capacitor coupled across output terminals of the power converter stores energy to maintain an output voltage during the idle period. At the beginning of the high power burst, current drawn by the power converter from the ac mains is high and may remain so throughout the burst. The duration of the idle periods are typically fixed, and on periods are adjusted to provide output voltage regulation. Thus, a conventionally designed power converter operates in a burst mode only at a high power level or is turned off for fixed periods of time.

Figure 1:
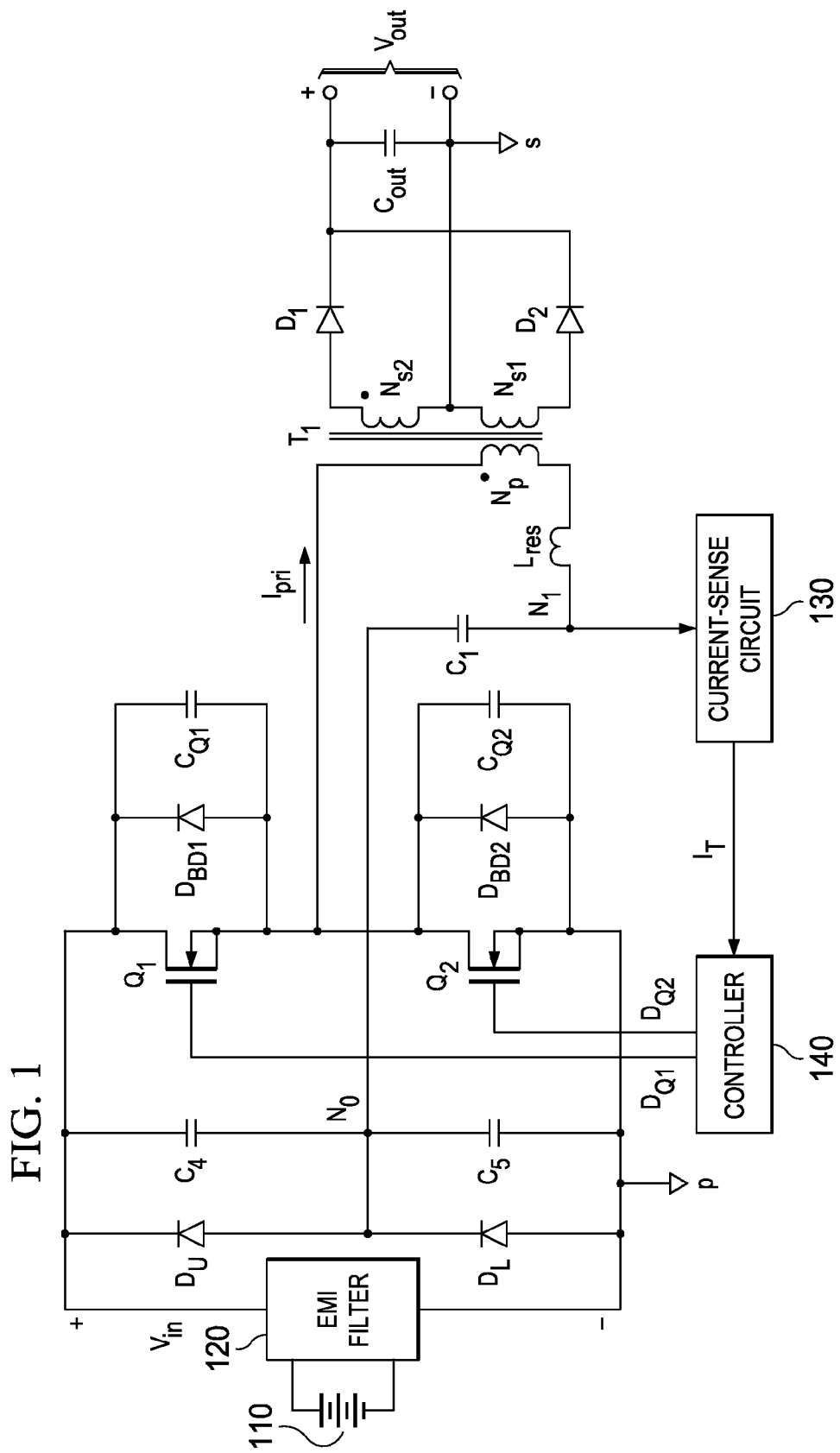
FIGS. 1 and 2 illustrate schematic diagrams of embodiments of power converters constructed according to the principles of the present invention.

Turning now to FIG. 1, illustrated is a schematic diagram of an embodiment of a power converter (e.g., a resonant half-bridge dc-dc power converter) constructed according to the principles of the present invention. The power converter includes first and second power switches $Q_1$, $Q_2$ in series with a dc bus (at an input of the power converter) produced by a dc input voltage source 110, represented in FIG. 1 by a battery, and filtered by an electromagnetic interference ("EMI") filter 120. First and second switch capacitors $C_{Q1}$, $C_{Q2}$ represent capacitances of the first and second power switches $Q_1$, $Q_2$, respectively, or alternatively, discrete capacitors optionally included in the power converter to retard voltage changes across the first and second power switches $Q_1$, $Q_2$. The EMI filter 120 provides a substantially filtered dc bus voltage or input voltage $V_{in}$ to a magnetic device (e.g., an isolating transformer or transformer $T_1$). Typically, the dc input voltage source 110 would be produced by a bridge rectifier or by a power-factor correction stage. Although the EMI filter 120 illustrated in FIG. 1 is positioned between the dc input voltage source 110 and the half-bridge capacitor voltage divider formed by first and second divider capacitors $C_4$, $C_5$, the EMI filter 120 may contain filtering components positioned elsewhere in the power converter. The transformer $T_1$, coupled to the first and second power switches $Q_1$, $Q_2$, has a primary winding $N_p$ and secondary windings $N_{s1}$, $N_{s2}$ with a turns ratio n:1:1 that is selected to provide an output voltage $V_{out}$ with consideration of the range of the input voltage $V_{in}$ and stress on the power train of the power converter. A resonant full-bridge dc-dc power converter may be formed with two power switches substituted for the first and second divider capacitors $C_4$, $C_5$. Each of the added power switches in a full-bridge configuration would be switched substantially synchronously with a diagonally oriented power switch.

The first and second power switches $Q_1$, $Q_2$ (e.g., n-channel field-effect transistors) are controlled by a controller 140 that produces control signals (e.g., gate-drive signals $D_{Q1}$, $D_{Q2}$) to control the first and second power switches $Q_1$, $Q_2$ to conduct for particular intervals of time (i.e., for particular "on" times). The term "signal" is used herein to represent, without limitation, a physical voltage or current. The first and second power switches $Q_1$, $Q_2$ alternately conduct in response to the gate-drive signals $D_{Q1}$, $D_{Q2}$ (e.g., gate-drive voltages) produced by the controller 140 with a switching frequency (designated "$f_s$") and a corresponding switching period $T_s=1/f_s$. The ac voltage appearing or present on the secondary windings $N_{s1}$, $N_{s2}$ of the transformer $T_1$ is rectified by first and second diodes $D_1$, $D_2$, and the dc component of the resulting waveform is coupled to the output through the low-pass output filter formed with output filter capacitor $C_{out}$ to produce the output voltage $V_{out}$. A sensor (e.g., a current-sense circuit 130) senses a condition of the power converter such as a current level of the primary current $I_{pri}$ that flows through the primary winding $N_p$ of the transformer $T_1$ and provides a sensed signal (e.g., a sensed current $I_T$) for the controller 140 representative of a level of the primary current $I_{pri}$, such as a peak or root-mean-square value of the primary current $I_{pri}$. Thus, the current-sense circuit 130 is coupled to a resonant circuit (see below) and is configured to provide a sensed signal (e.g., a sensed current $I_T$) representative of a current level or a power level of the power converter.

The power converter is operated as a resonant half-bridge topology. The term "resonant" is employed herein to refer to a switch-mode topology employing a resonant tank circuit or resonant circuit formed principally by a resonant capacitor $C_1$ and a resonant inductor $L_{res}$ to produce a current waveform that is a portion of, but typically not a full, sinusoidal waveform. The resonant circuit is series-coupled to the transformer $T_1$. The circuit node between the first and second divider capacitors $C_4$, $C_5$ substantially remains at a voltage approximately equal to half of the input voltage $V_{in}$ with respect to a primary ground, which is identified with the symbol "p." The secondary ground is identified with the symbol "s." The source of second power switch $Q_2$ is coupled to the primary ground p.

The resonant capacitor $C_1$ and the first and second divider capacitors $C_4$, $C_5$ are coupled together at common circuit node $N_0$. The first and second divider capacitors $C_4$, $C_5$ are roughly equal in capacitance and the combination is larger in capacitance than that of the resonant capacitor $C_1$. Such a structure provides symmetry from an EMI perspective for high frequency currents fed back to the dc input voltage source 110, and also provides a relatively unvarying voltage at the common circuit node $N_0$. In an alternative embodiment, one or both of the resonant capacitor $C_1$ and the first divider capacitor $C_4$ can be omitted from the power converter. If both the resonant capacitor $C_1$ and the first divider capacitor $C_4$ are omitted from the power converter, the second divider capacitor $C_5$ would be selected with a capacitance similar to that of resonant capacitor $C_1$. First and second clamping diodes $D_U$, $D_L$ provide a clamping mechanism to limit the voltage at the common node $N_0$ to be no greater than the input voltage $V_{in}$, and no lower than the primary ground p.

The resonant inductor $L_{res}$ includes the leakage inductance of the transformer $T_1$ referenced to its primary winding. The effective resonant capacitance is $C_{eff}$, given by the equation:

$$C_{eff} = C_1 \cdot (C_4 + C_5)/(C_1 + C_4 + C_5).$$

The half period $T_{half}$ of the resonant circuit, which is the period during which a power switch is turned on, can be represented approximately by the equation:

$$T_{half} = \pi \cdot \sqrt{L_{res} \cdot C_{eff}}.$$

Provided that the power switch on times are approximately equal to the half period $T_{half}$ shown above, the power converter operates as a "dc transformer" that produces an output voltage $V_{out}$ substantially proportional to the input voltage $V_{in}$. The output-to-input voltage ratio is substantially fixed by the transformer $T_1$ turns ratio, and thus the power converter per se does not provide output voltage regulation. The output voltage $V_{out}$ is substantially independent of the switching frequency of the first and second power switches $Q_1$, $Q_2$ over an operating range. Regulation of the output voltage $V_{out}$ can be provided by a pre-converter stage (not shown) that regulates the input voltage $V_{in}$ to the power converter illustrated in FIG. 1.

As introduced herein, control (e.g., modification, alteration, variation, etc.) of the switching frequency is employed to reduce power converter power dissipation at a low load or at no load. In an embodiment, the dead time between fixed on times (or conduction periods) of the first and second power switches $Q_1$, $Q_2$ is varied to control the switching frequency. Neither the dead times between power switch conduction periods nor the on times of the first and second power switches $Q_1$, $Q_2$ are required to be equal. In an embodiment, the on times of the first and second power switches $Q_1$, $Q_2$ are substantially equal to the half period $T_{half}$ defined by the resonant inductor $L_{res}$ and the effective resonant capacitance is $C_{eff}$. Of course, the dead times may be substantially equal.

Figure 2:
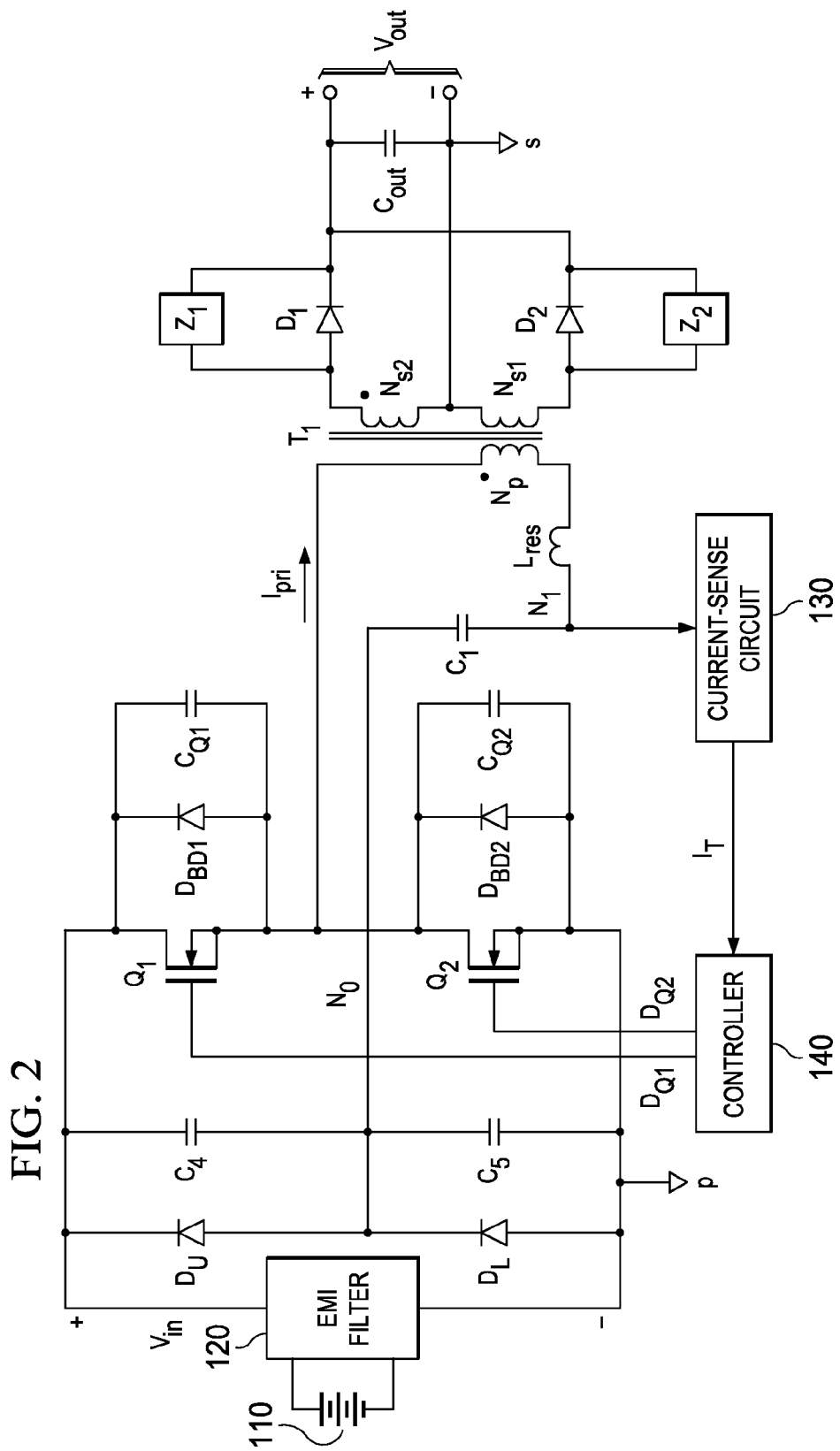

Turning now to FIG. 2, illustrated is a schematic diagram of an embodiment of a power converter (e.g., a resonant half-bridge dc-dc power converter) constructed according to the principles of the present invention. The power converter illustrated in FIG. 2 is similar to that illustrated in FIG. 1 but now includes first and second impedances $Z_1$, $Z_2$ coupled across (e.g., parallel-coupled to) the first and second diodes $D_1$, $D_2$, respectively. The first and second impedances $Z_1$, $Z_2$ may be formed with ceramic capacitors substantially tuned to a frequency of a damped oscillation of a voltage produced across the first and second diodes $D_1$, $D_2$ when the diodes are back biased during a switching cycle of the power converter. The first and second impedances $Z_1$, $Z_2$ are configured to convert the damped oscillatory voltage produced across the first and second diodes $D_1$, $D_2$ to a dc current supplied to the output voltage $V_{out}$ of the power converter as a further efficiency enhancing process. The first and second impedances $Z_1$, $Z_2$ may include a nonlinear circuit element such as a diode to enable conversion of the oscillatory voltage produced across the first and second diodes $D_1$, $D_2$ to the dc current supplied to the output voltage $V_{out}$ of the power converter.

Figure 3:
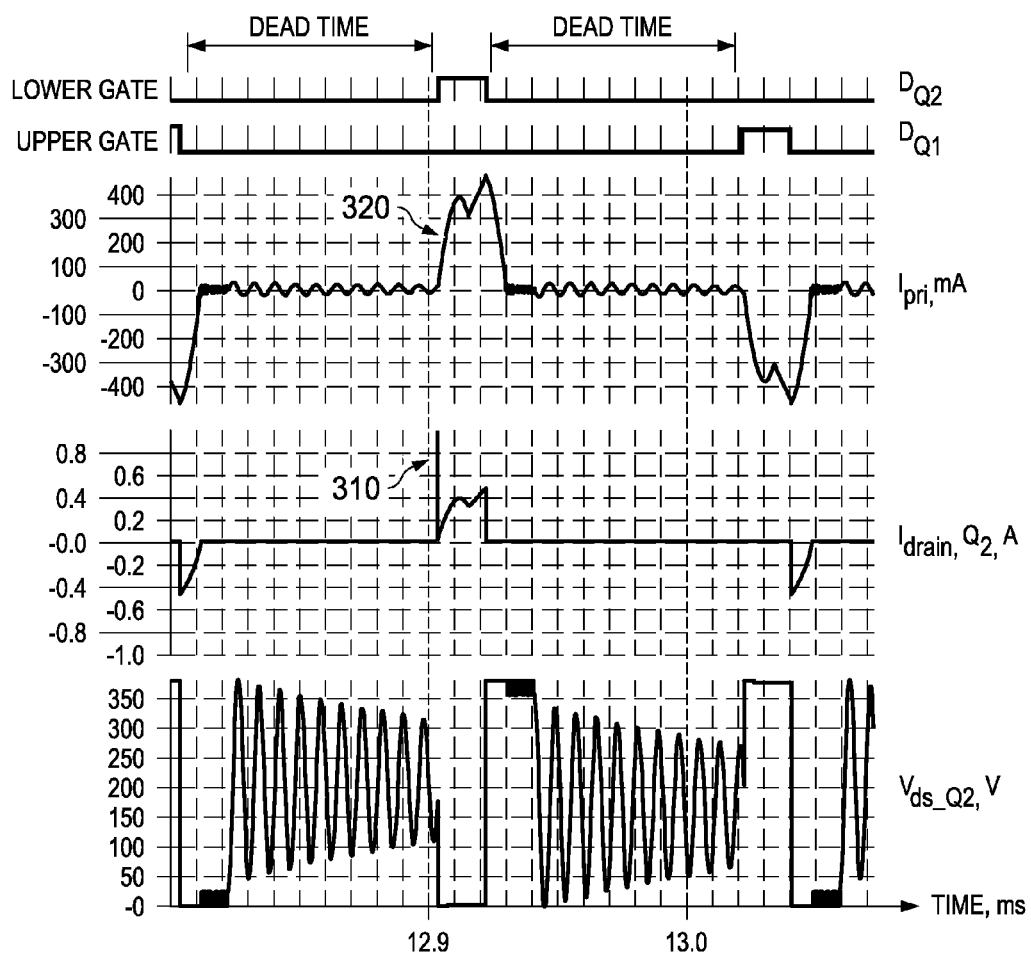
FIG. 3 illustrates a graphical representation of an exemplary operation of a power converter in accordance with the principles of the present invention.

Turning now to FIG. 3, illustrated is a graphical representation of an exemplary operation of a power converter (e.g., the power converter of FIG. 1) in accordance with the principles of the present invention. The first two waveforms (designated $D_{Q1}$ and $D_{Q2}$) illustrate the control signals (gate-drive signals) produced by the controller 140 for the first and second power switches $Q_1$, $Q_2$, respectively, in time (milliseconds ("ms")). The third waveform (designated $I_{pri}$) illustrates the current (in milliamperes ("mA") versus time in milliseconds) that flows through the primary winding of the transformer $T_1$. The fourth waveform (designated $I_{drain}$) illustrates a drain current (in amperes ("A") versus time in milliseconds) of the second power switch $Q_2$. The fifth waveform (designated $V_{ds\_Q2}$) illustrates the drain-to-source voltage (in volts ("V") versus time in milliseconds) of the second power switch $Q_2$. FIG. 3 illustrates dead times (designated "dead time") between the on times (or conduction periods) of the first and second power switches $Q_1$, $Q_2$ that are controlled by the controller 140. In addition, FIG. 3 illustrates a pulse of current 310 that flows out the drain (designated $I_{drain}$) of the second power switch $Q_2$ to discharge an output capacitance thereof (e.g., the second switch capacitor $C_{Q2}$). FIG. 3 also illustrates that a portion 320 of the waveform of current that flows through the primary winding (designated $I_{pri}$) of the transformer T1 is a portion of a sinusoidal waveform.

At a high output power level, the power train is operated at a switching frequency that is a little lower, for example ten percent lower, than the resonant frequency $f_{res}$ of the resonant circuit. At a high output power level, the on time $T_{on}$ of each of the first and second power switches $Q_1$, $Q_2$ corresponds to an on time that is equivalent to a frequency that is a little higher, for example three percent higher, than the resonant frequency of the resonant circuit. In other words, the on time $T_{on}$ for each of the first and second power switches $Q_1$, $Q_2$ is a little shorter or less than the half period $T_{half}$ of the resonant circuit, and together the first and second power switches $Q_1$, $Q_2$ are on for a period of time that is a little shorter or less than twice the half period $T_{half}$. The on times $T_{on}$ of the first and second power switches $Q_1$, $Q_2$ are not necessarily equal. Thus, the first and second power switches $Q_1$, $Q_2$ and the first and second diodes $D_1$, $D_2$ are turned off prior to the time the current in the resonant circuit reaches zero, and the switching period is kept long enough (including delay times) to assure that, throughout the tolerance band of variations of power converter inductances and capacitances, the current through a diode on a primary side of the power converter will shift to an anti-parallel diode (or body diode) of the power switch that is about to be turned on prior to turning on the same or that the resonant current has decayed to approximately zero.

In a conventional design, the power converter illustrated in FIG. 1 is operated at a fixed switching frequency. A drawback of a fixed switching frequency is that switching losses remain substantially constant and relatively high at light loads. The efficiency of the conventionally designed power converter is generally satisfactory over much of the load range except for light loads. The current through the resonant circuit, transformer, and output diodes decreases with load, thus decreasing conduction losses as the load is reduced. However, at light loads the circulating current in the resonant circuit as well as switching losses become high compared to conduction losses. Thus, power conversion efficiency of a conventionally designed converter is generally poor at light loads.

As introduced herein, a variable dead time dependent on a sensed signal (e.g., a power converter parameter) such as a power level or current level is employed between resonant pulses of a power converter such as a resonant bridge power converter. The current may be sensed on the primary side of the power converter by averaging a ripple voltage in a resonant circuit of the power converter. The sensed current is indicative of a power level of the power converter. Unlike small variations in dead time, such as 100 or 200 nanoseconds ("ns") variations in dead time employed in conventional designs, to enable zero-voltage switching of a power converter over a range of power converter operating conditions, a variation (e.g., a substantial variation) in dead time is employed herein to improve power conversion efficiency at light loads. Variations in dead time sufficient to provide, without limitation, a factor of ten or more reduction in switching frequency at light loads may be employed herein.

In U.S. patent application Ser. No. 12/486,520, entitled "Power Converter Employing a Variable Switching Frequency and a Magnetic Device with a Non-Uniform Gap," to A. Brinlee, et al. ("Brinlee"), filed Jun. 17, 2009, which is incorporated herein by reference, a switching frequency of a power switch of a power converter is controlled as a function of a condition of the power converter representing an output power. Also, a duty cycle of the power switch is controlled to regulate an output characteristic of the power converter. As introduced herein in an exemplary embodiment, dead times between on times (or conduction periods) of power switches is varied, and the power switches in a resonant bridge power converter are operated with a constant (or substantially constant) on time. Additionally, the on time of the power switches may be controlled (e.g., slightly modulated) to reduce or cancel a ripple voltage (e.g., a 120 hertz ripple voltage) of an input voltage source such as an upstream power converter (e.g., a power factor correction converter) to the power converter employing the power switches.

The dead times may be increased as the load is decreased as indicated by a decrease of a current level or power level of the power converter. This causes the switching frequency of the power converter to decrease at light loads, thereby reducing switching losses. The resonant bridge power converter continues to operate as a dc transformer. Therefore, increasing the dead time causes current through the resonant circuit to increase and sufficient power converter output power is automatically maintained to ensure adequate power transfer to maintain dc-transformer operation. The dead times are advantageously increased for loads below a chosen load point so that power losses can be reduced at low load levels, and conduction- and switching-loss trade-offs can be made for the power converter.

Figure 4:
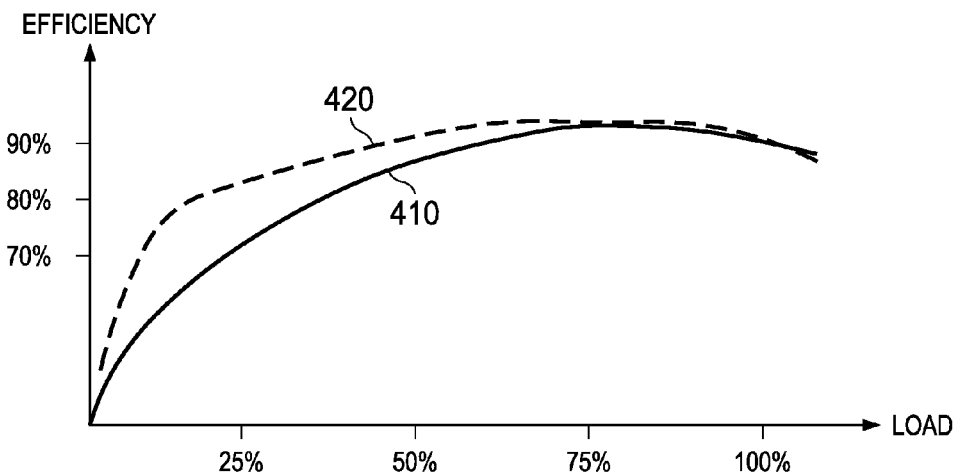
FIG. 4 illustrates a graphical representation of an exemplary power converter efficiency versus load according to the principles of the present invention.

Turning now to FIG. 4, illustrated is a graphical representation of an exemplary power converter efficiency versus load according to the principles of the present invention. A first waveform 410 demonstrates the efficiency for a conventional resonant bridge power converter and the second waveform 420 demonstrates an exemplary efficiency for a power converter (e.g., a resonant bridge power converter) constructed according to the principles of the present invention. The efficiency of a conventional resonant bridge power converter typically exhibits a maximum at about 50 to 75 percent load. As illustrated by the second waveform 420, if the dead times are kept relatively low from about 75 to 100 percent load, but is increased for loads below about 50 to 75 percent, the efficiency of the resonant bridge power converter according to the present invention remains relatively high down to small loads. It should be understood that the load point may be selected at a difference level and still fall within the broad scope of the present invention.

Figure 5:
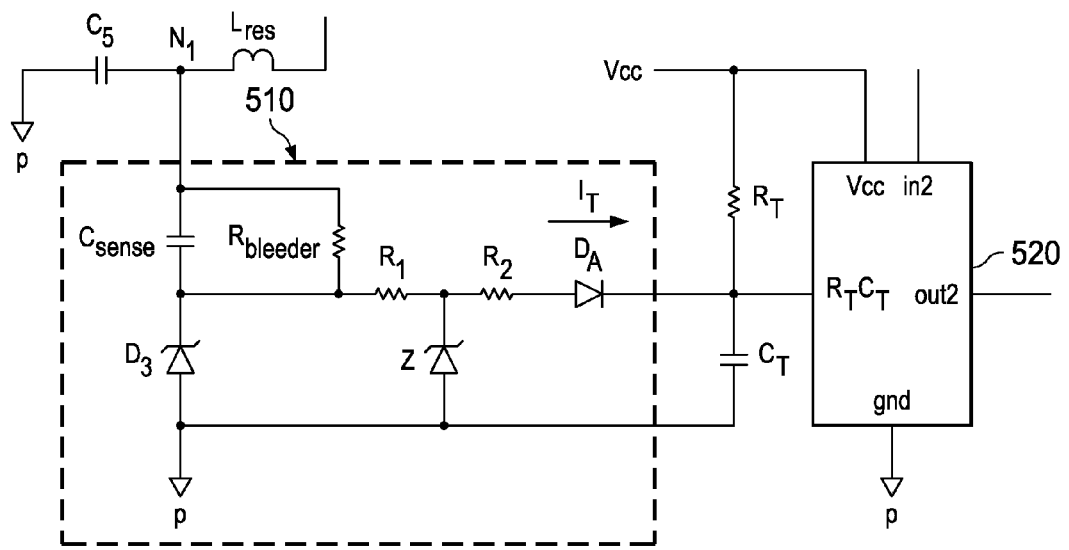
FIG. 5 illustrates a schematic diagram of an embodiment of sensor constructed according to the principles of the present invention.

Turning now to FIG. 5, illustrated is a schematic diagram of an embodiment of sensor (e.g., a current-sense circuit) 510 constructed according to the principles of the present invention. The current-sense circuit 510 produces a sensed signal (e.g., a sensed current $I_T$) representative of a current in a power converter such as the resonant bridge power converter illustrated in FIG. 1. The current-sense circuit 510 illustrates the use of a one-shot 520 to produce a variable delay. For purposes of illustration, the second divider capacitor $C_5$ and the resonant inductor $L_{res}$ from FIG. 1 are illustrated herein.

A typical way to use a one-shot 520 is to connect a timing capacitor $C_T$ (e.g., 100 pico farads) between the input pin $R_TC_T$ and local circuit ground (which is identified with the symbol "p"), and a timing resistor $R_T$ (e.g., one mega ohm) from the pin $R_TC_T$ to a positive bias voltage source $V_{CC}$. When the one-shot 520 is triggered, it releases the pin $R_TC_T$ to rise. The rate of rise is controlled by current flowing through the timing resistor $R_T$. When a certain threshold voltage level is reached at the pin $R_TC_T$, the one-shot 520 pulls the pin $R_TC_T$ down again, and keeps the pin $R_TC_T$ low until it receives another trigger input.

Control of the dead times is implemented by monitoring average ripple voltage at a resonant capacitor (such as the resonant capacitor $C_1$ of FIG. 1) and supplying the sensed current $I_T$ representative of a current in the resonant capacitor $C_1$. The ripple voltage is coupled to the current-sense circuit 510 with high-voltage sense capacitor $C_{sense}$. After sensing the ripple voltage with the high-voltage sense capacitor $C_{sense}$ in conjunction with a bleeder resistor $R_{bleeder}$ (e.g., one mega ohm), the voltage is clamped to local circuit ground p with clamp diode $D_3$ so that the sense capacitor $C_{sense}$ becomes charged to a value that represents the sensed current as a positive voltage. The first and second delay resistors $R_1$, $R_2$ set the maximum and minimum delays. Typically, the first delay resistor $R_1$ is less than one kilo ohm and the second delay resistor $R_2$ is greater than one mega ohm. Actual values may be determined by the switching frequency range desired. A positive voltage injects the sensed current $I_T$ through the second delay resistor $R_2$ into the timing capacitor $C_T$. The timing resistor $R_T$ also injects a dc current into the timing capacitor $C_T$ slightly less than $V_{CC}/R_T$.

In an alternative embodiment, the timing resistor $R_T$ coupled to the bias voltage source $V_{CC}$ can be replaced with a current source providing a current slightly less than $V_{CC}/R_T$. A limiting diode (e.g., Zener diode Z) can be used to limit the sensed current $I_T$ to a maximum value, thereby limiting a maximum value of the load at which the dead time varies (i.e., limiting a modification of the dead time to a dead time limit). A current in the resonant circuit or in another circuit element can be sensed with a different current-sense circuit including a current-sense transformer and a resistor-diode network coupled to a secondary side of the current-sense transformer to produce the sensed current $I_T$. A current-sense resistor coupled to an operational amplifier can also be employed to sense the current in the resonant bridge power converter to produce the sensed current $I_T$.

As illustrated in FIG. 5, the sensed current $I_T$ is coupled to the $R_TC_T$ timing pin of one-shot ("monostable multivibrator") 520 such as a CD4528 one-shot (e.g., a MM74HC4538 produced by Fairchild Semiconductor, described in the Fairchild Semiconductor datasheet titled "MM74HC4538 Dual Retriggerable Monostable Multivibrator," dated August 2000, which is incorporated herein by reference). The delay produced by one-shot 520 is controlled by the timing capacitor $C_T$ and the charging current flowing thereto set by the timing resistor $R_T$ coupled to the bias voltage source $V_{CC}$. A diode $D_4$ may be included in the current-sense circuit 510 to add nonlinearity to the timing change produced by the sensed current.

A lower limit for the switching frequency may be employed by choice of values for the first and second delay resistors $R_1$, $R_2$ and the timing resistor $R_T$ to prevent the switching frequency from decreasing into an audible range, such as a range of frequencies below 20 kilohertz ("kHz"). A substantial change in the switching frequency, such as a factor of ten or more change in the switching frequency over a range of loads presented to the power converter, may be employed to improve power conversion efficiency at a low power level. A lower limit of the switching frequency of one or four kilohertz may be employed to produce a substantial change in power conversion efficiency. A small varnished or potted transformer operated at a switching frequency of one or four kilohertz will generally not produce an objectionable level of audible noise. A burst mode of operation may also be employed at a very low load level to provide further improvement in power conversion efficiency.

Figure 6:
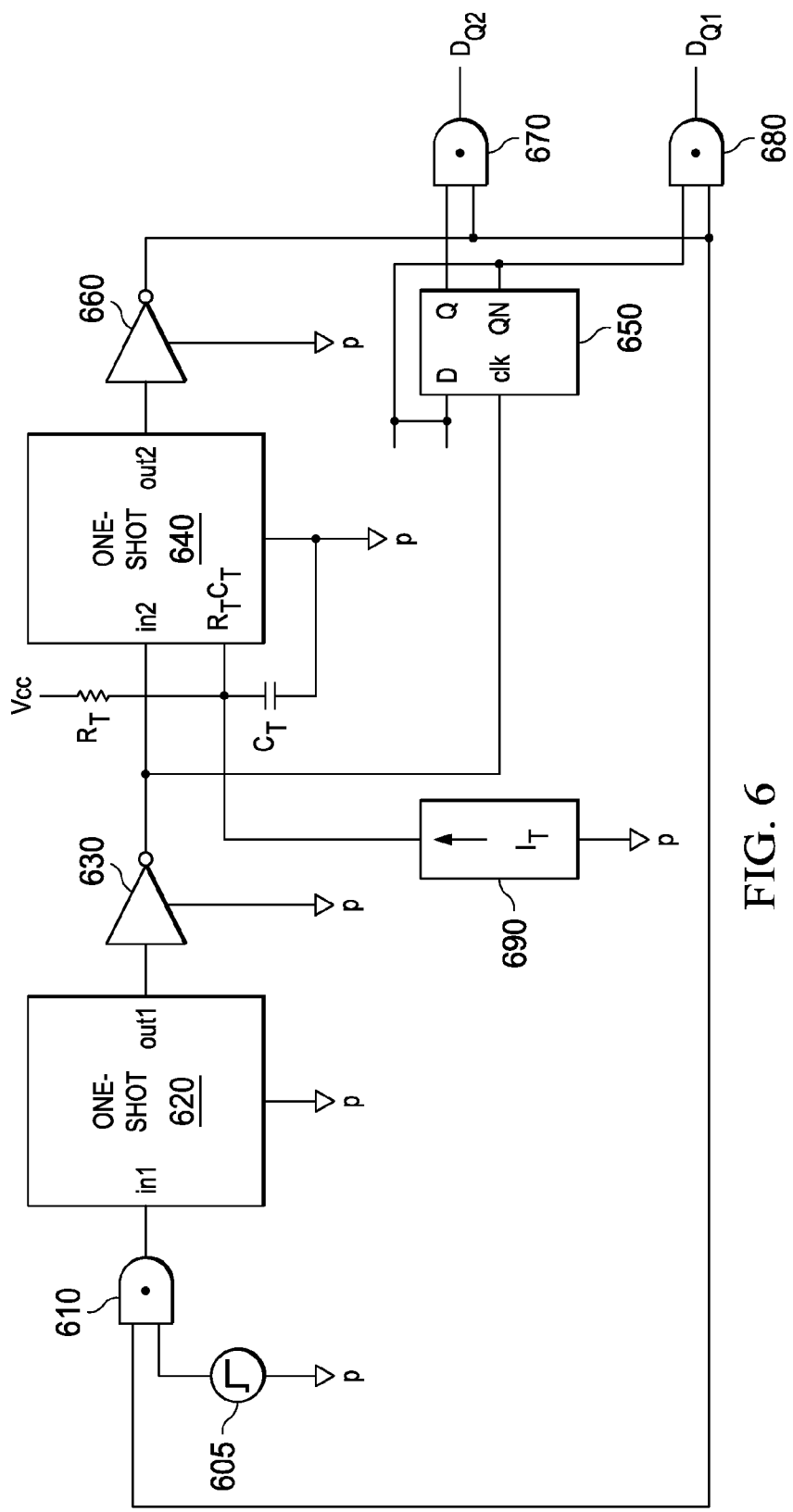
FIG. 6 illustrates a schematic diagram of an embodiment of a controller constructed according to the principles of the present invention.

Turning now to FIG. 6, illustrated is a schematic diagram of an embodiment of a controller constructed according to the principles of the present invention. The controller is responsive to a sensed signal (e.g., a sensed current $I_T$) to produce gate-drive signals $D_{Q1}$, $D_{Q2}$. Control of the dead times is implemented using a one-shot as illustrated and described with respect to FIG. 5. A first one-shot 620 creates a fixed pulse length to control the gate-drive signals $D_{Q1}$, $D_{Q2}$ whose lengths are slightly less than half of a resonant circuit period. The first one-shot 620 is employed to produce a fixed delay using a conventional resistor-capacitor connection to a $R_T C_T$ timing pin (not shown). The fixed delay may be set equal to, less than, or greater than a half period of a resonant circuit. This fixed delay corresponds to the on time of the power switches. If the on time of the power switches is greater than a half period of a resonant circuit, an opposing diode will conduct current while the driven power switch is still on, which may cause a current shoot-through that can destroy the power converter. Thus, it is preferable under such circumstances that the fixed delay remains less than or equal to a resonant half-period. A second one-shot 640 is responsive to the sensed current $I_T$ representative of the current in the resonant circuit, which is related to power converter load current, to adjust the dead-time length between the conduction periods of power switches such as the first and second power switches $Q_1$, $Q_2$ of the power converter FIG. 1. In the illustrated embodiment, a current source 690 produces the sensed current $I_T$, which may be representative of the sensed current $I_T$ from the current-sense circuit 510 illustrated and described above with respect to FIG. 5.

A startup step voltage 605 enables the controller to operate. The startup step voltage 605 is coupled to an input of an AND gate 610, the output of which produces the input for the first one-shot 620 to produce a fixed on time (e.g., 20 microseconds) for the first and second power switches $Q_1$, $Q_2$. The output of the first one-shot 620 is inverted by an inverter 630. The output of the inverter 630 provides a clocked input voltage "clk" for a D-type ("delay") flip-flop 650. The output of the inverter 630 also provides an input for the second one-shot 640. The output of the second one-shot 640 is inverted by an inverter 660 to provide a variable off-time delay for the first and second power switches $Q_1$, $Q_2$. The output of the second one-shot 640 and the Q and QN (i.e., the normal and the inverted) outputs of the D-type flip-flop 650 are coupled to the inputs of AND gates 670, 680 to provide the gate-drive signals $D_{Q1}$, $D_{Q2}$. Analogous to FIG. 5, a timing capacitor $C_T$ is coupled to the input pin $R_T C_T$ and local circuit ground (which is identified with the symbol "p") of the second one-shot 640, and a timing resistor $R_T$ from the pin $R_T C_T$ to a positive bias voltage source $V_{CC}$ of the second one-shot 640.

Thus, a power converter (e.g., a resonant bridge power converter) has been introduced wherein a dead time between conduction periods of power switches therein is controlled in response to a voltage or current representative of a power level or a current level of the power converter. The power converter includes first and second power switches coupled to an input of the power converter, and a sensor coupled to the power converter configured to provide a sensed signal representative of at least one of a current level and a power level of the power converter. The power converter also includes a controller configured to increase a dead time between conduction periods of the first and second power switches when the sensed signal indicates a decrease of at least one of the current level and the power level of the power converter. In a related embodiment, a transformer is coupled to the first and second power switches, and a resonant circuit is series-coupled to a primary winding of the transformer. The sensor is configured to provide the sensed signal by monitoring an average ripple voltage of the resonant circuit. The resonant circuit may include a resonant inductor and a resonant capacitor coupled to the primary winding of the transformer.

In an alternative embodiment, the sensor may include a sense capacitor, a clamp diode, and at least one delay resistor, and the controller may include a timing resistor, a timing capacitor and a one-shot. The sensor may be configured to limit a value of the sensed signal, thereby limiting a modification of the dead times to a dead time limit. The sensor may also include a limiting diode configured to limit a value of the sensed signal.

In related embodiments, the controller is configured to control the dead times to control a switching frequency of the first and second power switches. The controller is also configured to control the conduction periods of the first and second power switches to be substantially constant. The controller may be configured to control a conduction period of at least one of the first and second power switches to be substantially equal to (including slightly less than) a half period of a resonant circuit of the power converter. In a further embodiment, a diode and a parallel-coupled impedance are coupled to a secondary winding of the transformer. The parallel-coupled impedance may be configured to convert a damped oscillatory voltage produced across a diode to a dc current supplied to an output of the power converter.

In another aspect, the present invention provides a method of operating a power converter. The method includes coupling first and second power switches to an input of the power converter, providing a sensed signal representative of at least one of a current level and a power level of the power converter, and controlling a dead time between conduction periods of the first and second power switches as a function of the sensed signal. In a related embodiment, the power converter may include a transformer coupled to the first and second power switches and a resonant circuit in series with a primary winding of the transformer. In accordance therewith, the method may provide the sensed signal by monitoring an average ripple voltage of the resonant circuit.

Those skilled in the art should understand that the previously described embodiments of a power converter including circuits to reduce no load or light load losses and related methods of operating the same are submitted for illustrative purposes only. While a power converter including circuits to reduce no load or light load losses has been described in the environment of a power converter, these processes may also be applied to other systems such as, without limitation, a bias supply, a power amplifier, or a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A power converter, comprising:
   first and second power switches coupled to an input of said power converter;
   a sensor configured to provide a sensed signal representative of at least one of a current level and a power level of said power converter, and limit a value of said sensed signal; and
   a controller configured to increase a dead time between conduction periods of said first and second power switches when said sensed signal indicates a decrease of at least one of said current level and said power level of said power converter, a modification of said dead time being constrained to a dead time limit in accordance with said limit of said value of said sensed signal.

2. The power converter as recited in claim 1 wherein said conduction periods of said first and second power switches are substantially constant.

3. The power converter as recited in claim 1 wherein said controller is configured to control said conduction period of at least one of said first and second power switches to be substantially equal to a half period of a resonant circuit of said power converter.

4. The power converter as recited in claim 1, further comprising:
   a transformer coupled to said first and second power switches; and
   a resonant circuit coupled to a primary winding of said transformer, wherein said sensor is configured to provide said sensed signal by monitoring an average ripple voltage of said resonant circuit.

5. The power converter as recited in claim 1, further comprising:
   a transformer coupled to said first and second power switches; and
   a resonant circuit including a resonant inductor and a resonant capacitor coupled to a primary winding of said transformer.

6. The power converter as recited in claim 1 wherein said sensor includes a sense capacitor, a clamp diode, and at least one delay resistor, and said controller includes a timing resistor, a timing capacitor and a one-shot.

7. The power converter as recited in claim 1 wherein said sensor is configured to limit said value of said sensed signal with a limiting diode.

8. The power converter as recited in claim 1 wherein said controller is configured to control said dead time to control a switching frequency of said first and second power switches.

9. The power converter as recited in claim 1 further comprising a diode and a parallel-coupled impedance coupled to a secondary winding of a transformer of said power converter, said impedance being configured to convert a damped oscillatory voltage produced across said diode to a dc current supplied to an output of said power converter.

10. The power converter as recited in claim 1 wherein said controller is configured to control said conduction period of at least one of said first and second power switches to reduce a ripple voltage with respect to an input voltage source at said input of said power converter.

11. A method of operating a power converter, comprising:
    coupling first and second power switches to an input of said power converter;
    providing a sensed signal representative of at least one of a current level and a power level of said power converter;
    limiting a value of said sensed signal; and
    controlling said first and second power switches by increasing a dead time between conduction periods thereof when said sensed signal indicates a decrease of at least one of said current level and said power level of said power converter, a modification of said dead time being constrained to a dead time limit in accordance with limiting said value of said sensed signal.

12. The method as recited in claim 11 wherein said controlling said first and second power switches includes controlling said conduction periods of said first and second power switches to be substantially constant.

13. The method as recited in claim 11 wherein said controlling said first and second power switches includes controlling said conduction period of at least one of said first and second power switches to be substantially equal to a half period of a resonant circuit of said power converter.

14. The method as recited in claim 11, further comprising:
    coupling a transformer to said first and second power switches;
    coupling a resonant circuit to a primary winding of said transformer; and
    providing said sensed signal by monitoring an average ripple voltage of said resonant circuit.

15. The method as recited in claim 11, further comprising:
    coupling a transformer to said first and second power switches; and
    coupling a resonant circuit including a resonant inductor and a resonant capacitor to a primary winding of said transformer.

16. The method as recited in claim 11 wherein said providing said sensed signal is performed by a sensor including sense capacitor, a clamp diode, and at least one delay resistor and said controlling said first and second power switches is performed by a controller including a timing resistor, a timing capacitor and a one-shot.

17. The method as recited in claim 11 wherein said limiting said value of said sensed signal is performed with a limiting diode.

18. The method as recited in claim 11 wherein said controlling said first and second power switches includes controlling a switching frequency thereof.

19. The method as recited in claim 11, further comprising:
    coupling a transformer to said first and second power switches;
    coupling a diode to a secondary winding of said transformer, and converting a damped oscillatory voltage produced across said diode to a dc current supplied to an output of said power converter.

20. The method as recited in claim 11 wherein said controlling said first and second power switches includes controlling said conduction period of at least one of said first and second power switches to reduce a ripple voltage with respect to an input voltage source at said input of said power converter.

* * * * *